United States Patent
Judd et al.

(10) Patent No.: US 11,713,847 B2
(45) Date of Patent: Aug. 1, 2023

(54) STEAM TRAP

(71) Applicant: Imperium Technologies, LLC, Cedar Park, TX (US)

(72) Inventors: Gordon Judd, Pleasant Hill, CA (US); Brad Medford, Cedar Park, TX (US)

(73) Assignee: Imperium Technologies, LLC, Cedar Park, TX (US)

( * ) Notice: Subject to any disclaimer, the term of this patent is extended or adjusted under 35 U.S.C. 154(b) by 0 days.

(21) Appl. No.: 17/931,727

(22) Filed: Sep. 13, 2022

(65) Prior Publication Data

US 2023/0081933 A1    Mar. 16, 2023

Related U.S. Application Data

(60) Provisional application No. 63/244,960, filed on Sep. 16, 2021.

(51) Int. Cl.
*G05B 19/416* (2006.01)
*G05B 19/406* (2006.01)
*F16T 1/48* (2006.01)
*G08B 21/20* (2006.01)

(52) U.S. Cl.
CPC ............ *F16T 1/48* (2013.01); *G05B 19/406* (2013.01); *G05B 19/416* (2013.01); *G08B 21/20* (2013.01); *G05B 2219/37371* (2013.01)

(58) Field of Classification Search
CPC ....... F16T 1/48; G05B 19/406; G05B 19/416; G05B 2219/37371; G08B 21/20
See application file for complete search history.

(56) References Cited

U.S. PATENT DOCUMENTS

| | | |
|---|---|---|
| 6,279,593 B1 | 8/2001 | Sheppard |
| 7,664,610 B2 | 2/2010 | Anderson et al. |
| 8,050,875 B2 | 11/2011 | Karschnia |
| 10,641,412 B2 | 5/2020 | Karschnia et al. |
| 10,837,600 B2 | 11/2020 | Miller et al. |
| 11,073,239 B2 | 7/2021 | Wingerath |
| 11,125,386 B2 | 9/2021 | Slanover |
| 11,226,302 B2 | 1/2022 | Wentzloff et al. |
| 11,242,954 B2 | 2/2022 | Katsura et al. |
| 2010/0281954 A1 | 11/2010 | Oh et al. |
| 2013/0167783 A1* | 7/2013 | Poczka ............... G01M 3/2807 122/504.2 |
| 2016/0273953 A1 | 9/2016 | Schlensker |
| 2019/0011936 A1* | 1/2019 | Nishizato ............... G05D 7/06 |
| 2019/0032848 A1* | 1/2019 | Miller ..................... F01K 25/08 |

(Continued)

FOREIGN PATENT DOCUMENTS

WO    2022118060 A1    6/2022

OTHER PUBLICATIONS

Public Data Sheet, "Emerson Plantweb Insight," www.Emerson.com, Apr. 2021.

(Continued)

*Primary Examiner* — Yuhui R Pan
(74) *Attorney, Agent, or Firm* — Jackson Walker L.L.P.

(57) ABSTRACT

A steam trap may include a processor and an electronic water sensor configured to determine a presence of water in the steam trap and transmit data regarding the presence of the water to the processor. The steam trap may further include an electronically actuatable valve configured to be driven by signals from the processor.

15 Claims, 8 Drawing Sheets

(56) References Cited

U.S. PATENT DOCUMENTS

2021/0033245 A1* 2/2021 Wingerath ................ F16T 1/48
2021/0041383 A1 2/2021 Wentzloff et al.
2021/0215645 A1* 7/2021 Owens ..................... F17D 1/06

OTHER PUBLICATIONS

Reference Manual, "Emerson Plantweb Insight," www.Emerson.com, Jun. 2020.
Quick Start Guide, "Emerson Plantweb Insight," www.Emerson.com, Mar. 2020.
Armstrong Intelligent Monitoring, "Steam Trap Monitoring," ST5700 Series & WirelessHart, www.armstronginternational.com, Nov. 2022.
Armstrong Intelligent Monitoring, "Steam Trap Monitoring," ST6700 Series & ISA100 Wireless, www.armstronginternational.com, Aug. 2022.
Armstrong Intelligent Monitoring, "Steam System Monitoring," SteamEye, www.armstronginternational.com, Nov. 2022.
International Search Report and Written Opinion of the International Searching Authority, International Application No. PCT/US22/43343, dated Jan. 6, 2023.

* cited by examiner

STEAM TRAP

TECHNICAL FIELD

The present disclosure relates in general to steam traps, and more particularly to improvements that may be made in steam traps through the use of information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use. In addition, information handling systems may include a variety of hardware and software components that may be configured to process, store, and communicate information and may include one or more computer systems, data storage systems, and networking systems.

Embodiments of this disclosure relate to steam systems, and in particular to steam traps. Steam is often used to transport thermal energy for use in manufacturing, power generation, building heating, and other applications. As steam pipes lose heat, some steam may condense back to water, and this condensate may then need to be removed from the pipe.

Steam traps are devices for removing such condensate water from the pipes. The reliable removal of condensate water from the pipe is critical for safety reasons, and the efficient removal of condensate water is necessary for efficiency and sustainability reasons. Additionally, monitoring individual traps and the overall comprehensive plant operation is valuable in the operation and maintenance of a steam system.

However, existing steam traps have shortcomings in terms of maintainability and monitoring. Currently, steam traps tend to be purely mechanical devices. They depend on floats, pressure, and other mechanical means and thermodynamic properties to detect the presence of and remove water in a steam system. This design presents multiple difficulties, such as differentiating between condensed steam (water) and steam vapor at the same pressure and temperature, removing all or substantially all of the water at varying load conditions while preventing the steam vapor from leaving the piping system, and the lack of telemetry or external indications as to the functioning and/or alarm conditions that may occur in a steam system.

Embodiments of this disclosure may be more reliable and more efficient than existing systems, as well as requiring less maintenance. Embodiments may also provide remote monitoring and status notification. Thus embodiments of this disclosure may be referred to as internet-of-things (IOT) and/or industrial internet-of-things (IIOT) steam traps.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with existing steam traps may be reduced or eliminated.

In accordance with embodiments of the present disclosure, a steam trap may include a processor and an electronic water sensor configured to determine a presence of water in the steam trap and transmit data regarding the presence of the water to the processor. The steam trap may further include an electronically actuatable valve configured to be driven by signals from the processor.

In accordance with these and other embodiments of the present disclosure, a steam system may include a centralized information handling system and a plurality of steam traps. Each respective steam trap may include a processor, an electronic water sensor configured to determine a presence of water in the steam trap and transmit data regarding the presence of the water to the processor, an electronically actuatable valve configured to be driven by signals from the processor, and a network interface. The processor may be configured to transmit, via the network interface, telemetry data regarding physical parameters measured by the respective electronic water sensor to the centralized information handling system. The centralized information handling system may be configured to aggregate the telemetry data from each steam trap and analyze the aggregated data.

In accordance with these and other embodiments of the present disclosure, an article of manufacture may include a non-transitory, computer-readable medium having computer-executable code thereon that is executable by a processor of an information handling system for implementing portions of the present disclosure.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
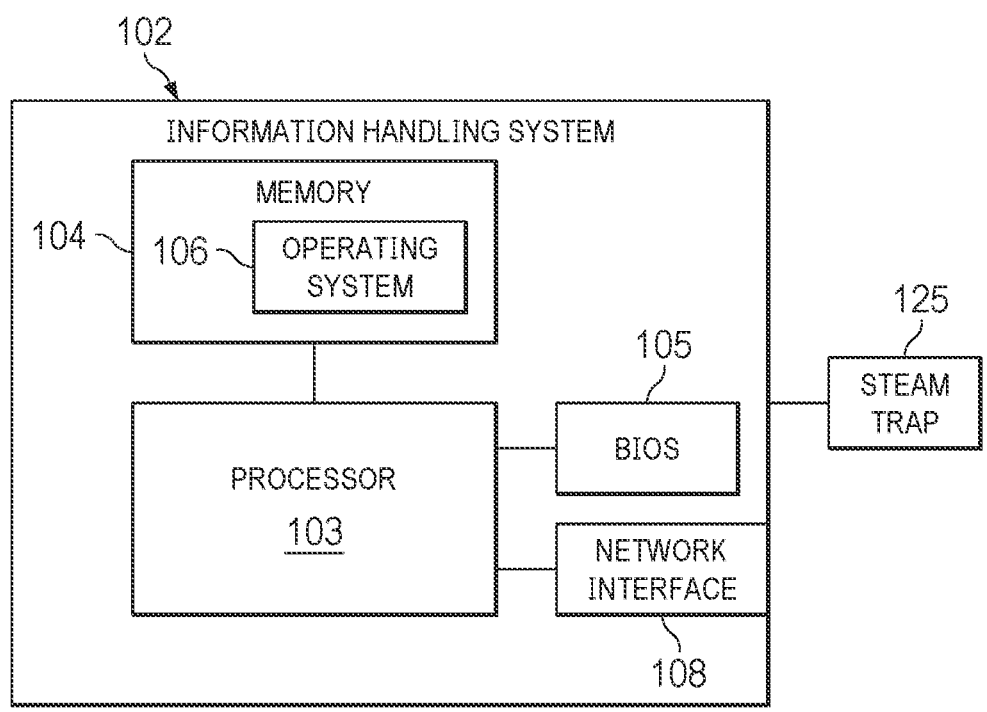
FIG. 1 illustrates a block diagram of an example information handling system, in accordance with embodiments of the present disclosure.

Preferred embodiments and their advantages are best understood by reference to FIGS. 1 through 8, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile and/or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Information handling system 102 may in some embodiments be communicatively coupled to steam trap 125 (or it may be a component thereof, or steam trap 125 may be a component of information handling system 102). As discussed above, steam traps 125 may be used to remove water from a steam system.

Figure 2:
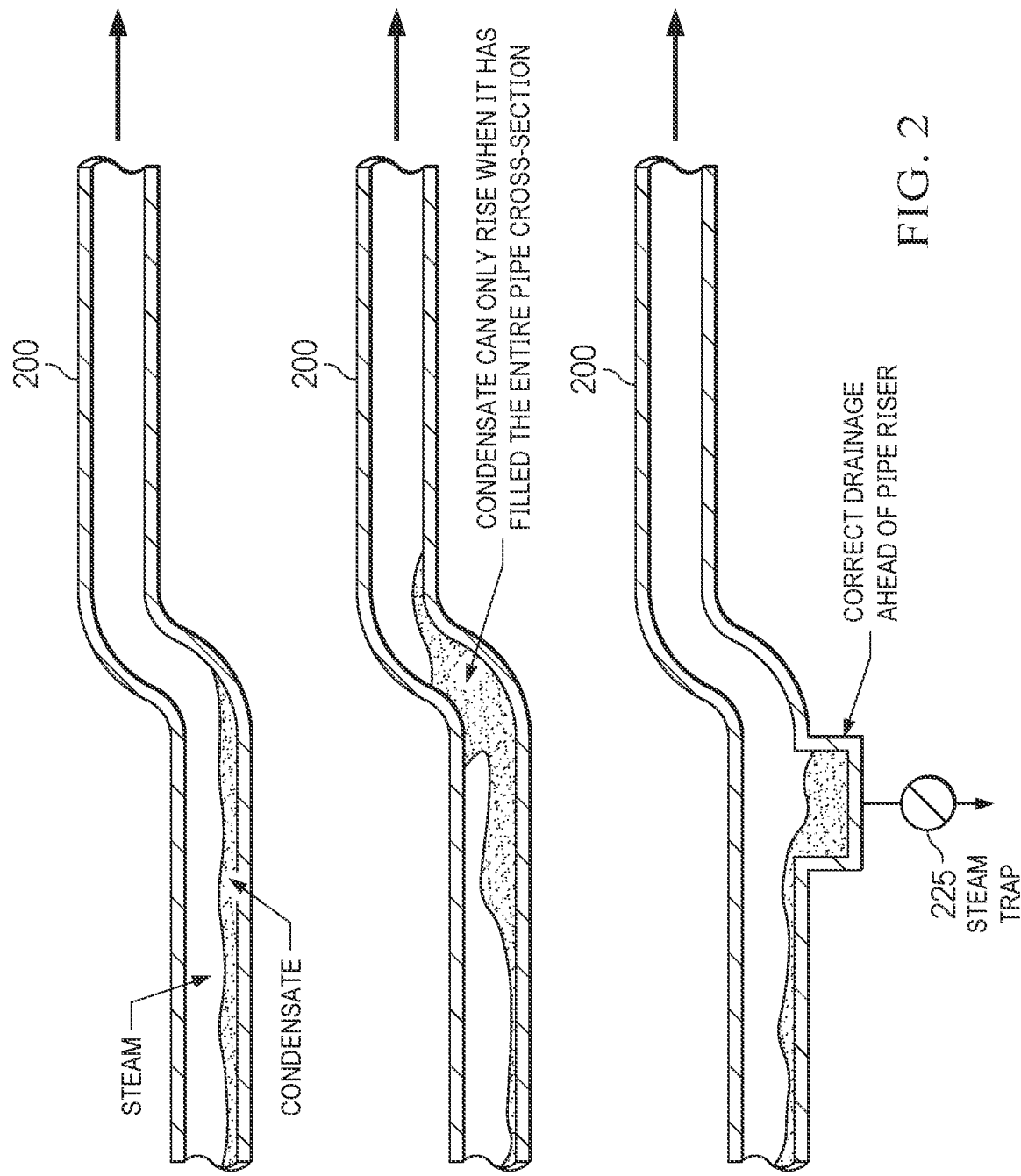
FIG. 2 illustrates an example steam pipe, in accordance with embodiments of the present disclosure.

FIG. 2 provides an example view of a steam trap 225 removing condensate from a pipe 200. In the first view, a small amount of condensate has accumulated in advance of a riser in pipe 200. In the second view, sufficient condensate has accumulated to plug the flow of steam, and only then can the condensate rise to the next portion of pipe 200. In the third view, a steam trap 225 has been installed to drain the condensate before it reaches the riser.

Figure 3:
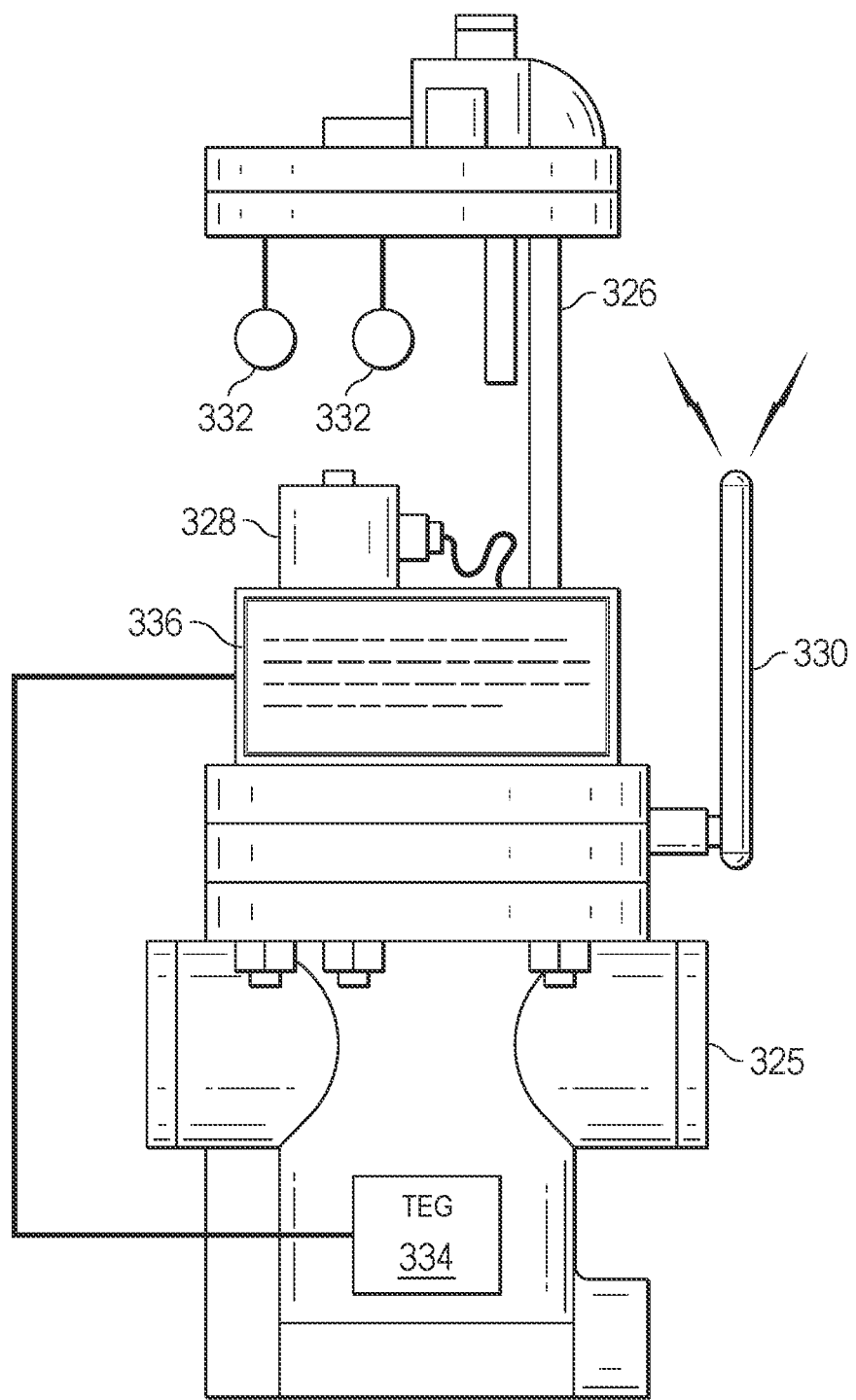
FIG. 3 illustrates an example steam trap, in accordance with embodiments of the present disclosure.

FIG. 3 provides a view of an example steam trap 325, according to some embodiments of this disclosure. The steam trap of FIG. 3 may be used as a drop-in replacement for existing steam traps in some embodiments. As shown, the mechanical float of a traditional steam trap may be replaced with one or more solid-state sensors 326 to determine a water level and other quantities. For example, a capacitive water sensor may be used in some embodiments, due to the relatively non-conductive nature of steam condensate. Pressure transducers 332 may also be used to monitor the pressure upstream and downstream of steam trap 325.

A solenoid drain valve 328 may be used to actuate steam trap 325. An information handling system such as information handling system 102 (e.g., a microcontroller) may be incorporated as well to control functionality and provide telemetry data and/or remote control functionality. As discussed in more detail herein, embodiments may allow for monitoring of data such as water and/or steam flow rate, temperature, pressure, presence of water, etc.

A thermoelectric generator (TEG) 334 may be used in some embodiments to provide power to components of the steam trap. For example, TEG 334 may use the Seebeck effect to extract energy from the temperature differential between hot steam and the relatively cool ambient environment. In one embodiment, a status display 336 may be included on the steam trap for in-person inspections. Status display 336 may be coupled to a control system of the steam trap via any suitable communications bus (e.g., an I2C bus in some embodiments). In these and other embodiments, network connectivity (e.g., wireless connectivity via antenna 330) may be included for remote data gathering and/or control. For example, antenna 330 may be operable to communicate via LTE, GSM, LoRa, Wi-Fi, or any other suitable communications standard.

Embodiments may detect condensate water in a steam distribution system and remove it via electronic and/or electrical devices. The detection may be accomplished without requiring the use of moving parts, but instead may rely on electronic condensate detection.

The release of condensate water may be done via electromechanical devices, such as solenoids, servo controllers, etc. In some embodiments, measurement devices may allow for confirmation of valve position and other parameters for reliability purposes. Embodiments may also communicate various parameters such as multiple pressure points, temperature, flow, acoustic, vibration, and water flow rates.

As noted above, some embodiments may include a TEG chip to enable the system to operate in the absence of utility power or the need for battery replacement. TEG power may also give a high-reliability power source to avoid problems with failure of utility power, battery replacement issues, etc.

Thus embodiments may provide many advantages relative to existing solutions. The electronic methods used to detect condensate water need not have moving parts to wear out. Furthermore, the precision provided via electronic detection may be more accurate, have a faster response time, and be more reliable than floats and other purely mechanical methods.

Further, the ability to release water in high temperature/pressure environments requires a level of maintenance that is difficult to sustain over time. The reliability of electromechanical devices tends to be superior to purely mechanical devices, and they can also provide electrical and other forms of feedback to ensure proper valve operation and detect failures. Embodiments may provide a complete view of individual points in the steam system, as well as an overall view by monitoring all valve statuses and other detailed parameters.

Existing mechanical steam traps are prone to failure. The valves typically fail in one of two ways, either open or closed. If a valve fails open, then steam is lost from the steam system. Steam goes from where it is needed in the pipe to where it does not provide any useful purpose, increases the cost of operation, and requires more resources to be used to produce the needed steam. If a valve fails closed, water builds up in the steam pipe and causes premature and/or excess corrosion and erosion of the metal pipe, and it also can lead to catastrophic water hammer events that are a significant threat to personnel and equipment.

Existing steam traps also do not have internal performance monitoring or alarm functionality.

By providing an electromechanical method of detection and water removal, an increase in reliability may be obtained.

Embodiments may provide visible status in real time or accelerated time both locally and/or remotely. A more reliable steam trap is also enabled due to the simplicity and reliability of the electronics and valve control. TEG power generation may run the steam trap valve as opposed to relying on physical hydrostatic properties to actuate a valve. The internal monitoring of the steam, valve position, temperature, pressure, vibration, acoustic, and other parameters may also provide valuable data. Measurement of the volume of condensate removed may be available both locally (e.g., on an electronic display at the steam trap) and remotely (e.g., via a network).

Acoustic sensors may also be configured to communicate mechanical situations that can be detected by acoustical means (e.g., cavitation, construction events, etc.). This type of information currently requires operations staff to use stethoscopes and other devices to listen.

Vibration sensors may detect vibration in the system. This data (as well as other data) may be compressed for transmission over bandwidth-constrained data links in some cases. For example, a discrete cosine transform (DCT) is one such compression mechanisms, but one of ordinary skill in the art with the benefit of this disclosure will appreciate that other techniques may be used as well.

Temperature may be measured to determine the steam temperature inside the device, as well as the external ambient temperature. Pressure sensors may provide remote steam system pressure information.

Localized data displays (wired or wireless) may provide historic trending of total water drained over various time frames, as well as temperature, pressure, and any other parameters or calculated quantities based on measurements. Further, simple displays such as colored LEDs may be used to display system status.

A steam trap may be constructed of a material that is of sufficient strength and durability to support the intended environment (e.g., steel, aluminum, plastic, or any other suitable material). The trap may include one or more input ports and one or more output ports for condensate transmission. Additionally, it may have one or more drain ports with one or more valves that may be opened as determined by the electronic control system, and/or manually for testing or maintenance. It may also have a mechanically activated drain port in some embodiments to provide a backup should the primary drain port fail, as well as for condensate removal during trap maintenance/testing. The drain's primary mechanism for operation may be a pressure differential between the steam environment and the location where the condensate is drained, gravity, or any other suitable method for fluid movement.

A valve according to this disclosure may be implemented in any of several configurations. One embodiment may include a binary open or closed valve. Such a valve may be normally open or normally closed, latching or non-latching, etc. Another embodiment may include a valve wherein the degree of opening is controlled by a servo or other motorized system that opens the valve a specified amount under electronic control based on the amount of water or other system conditions.

An electronic assembly may include one or more water level sensors (e.g., both internal and external). Such a sensor may be capacitive, optical, acoustic (e.g., based on a tuning fork, a piezoelectric component, etc.), and/or conductive (which may be suitable for outside water or contaminated water). An internal visual system may be used for water inspection, and an external camera may be used for visual inspection and monitoring. A tamper switch may be included for security and operational configuration.

A valve may include a solenoid, a latching solenoid, a servo with needle valve, ball valve, gate valve, globe valve, or cover, or any other suitable mechanism. An independent position sensor for the valve may include an optical sensor, a magnetic sensor, a mechanical switch, or any other suitable mechanism for determining the state of the valve.

A microcontroller may be included to read sensor data, control communications, record data, process/compress data as needed, operate in power-constrained environments, and provide an accurate real-time clock system for timestamping of events. The clock may be updated via the communication network or by using any other accurate clock timing references or some combination thereof.

Sensors (internal and/or external) may include any of various types of sensor. It should be noted that in monitoring systems, these sensors may be used in the steam generation plant, the distribution system, and/or some combination thereof. For example, sensors may include pressure sensors, temperature sensors, acoustic sensors for system analysis, vibration sensors, pH sensors, etc. A local display with a local user interface (e.g., a touchscreen, a keyboard, a mouse, and/or any other suitable user interface components) may allow on-site operation. An electrical interface may be used for control, maintenance, and testing.

Any suitable communications interface(s) may be used, such as baseband (e.g., cellular) communication, RS-422, Ethernet, or any other suitable protocol. An RF antenna (internal and/or external) may also be used for communication.

Embodiments may be powered by one or more power systems. While traditional power supplies can be used to power devices, a TEG may also be used in addition or alternatively. Traditional power supplies can be used inside plants, where local utility power is available, and/or for testing. A TEG power supply may utilize the temperature differential found on the walls of the trap or the walls of the steam pipe. Standard voltages and regulation may be provided to the system using any suitable circuitry.

Power storage devices such as capacitors, rechargeable batteries (e.g., lithium ion), etc. may be used to provide power in the case of power outages. The power system may, in conjunction with the controller, provide power conditioning, backup power status, and "last gasp" functionality prior to going offline due to the power system being fully drained. For example, the last gasp functionality may be used to transmit a diagnostic message about the power outage and/or take any other suitable action.

Figure 4:
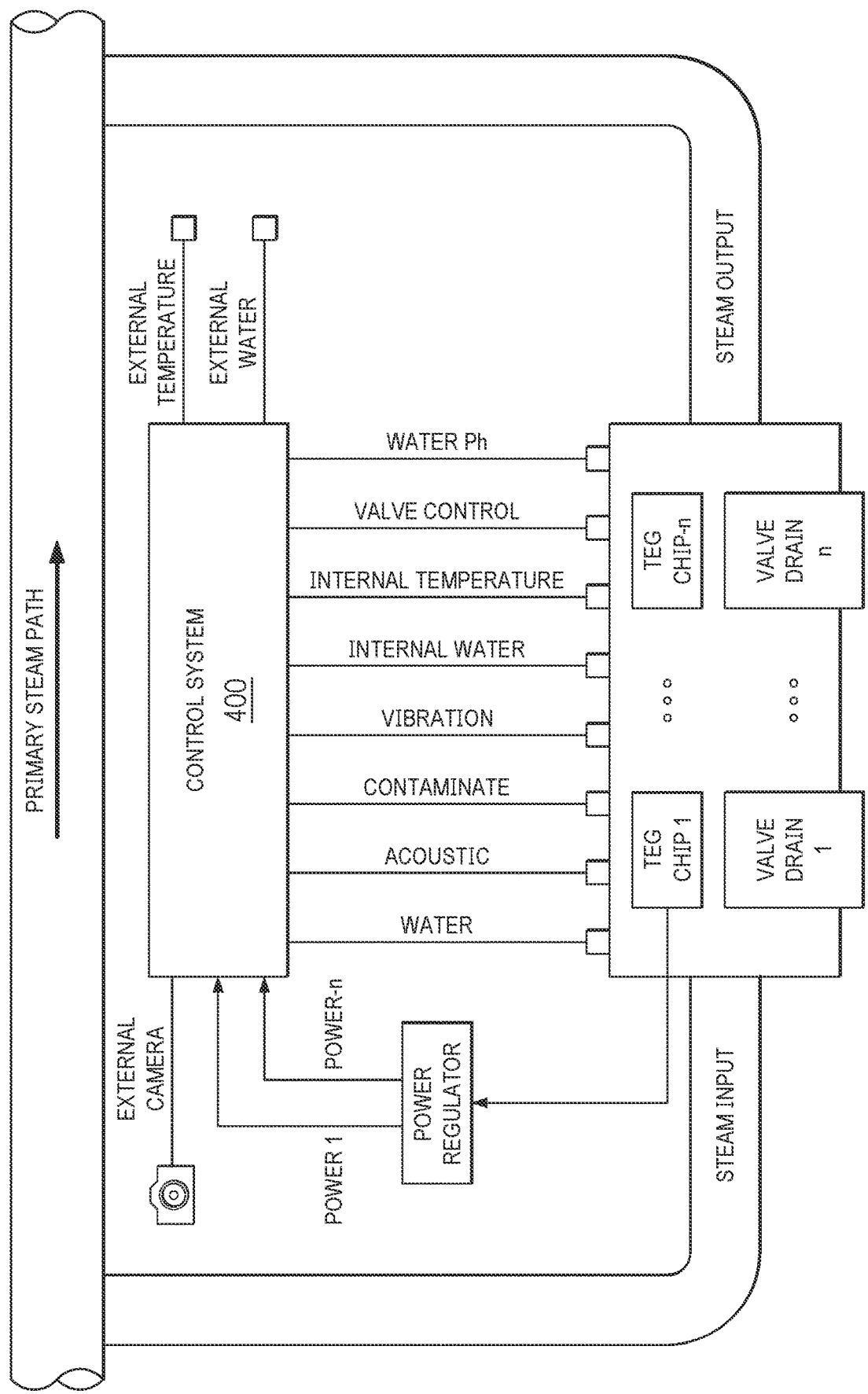
FIG. 4 illustrates an example steam trap, in accordance with embodiments of the present disclosure.

FIG. 4 provides a mechanical block diagram of selected components of an example steam trap, according to some embodiments. Control system 400 receives input from various sensors as shown and controls one or more valves in response. The steam trap is powered via one or more TEG chips and a power regulator in this implementation.

Figure 5:
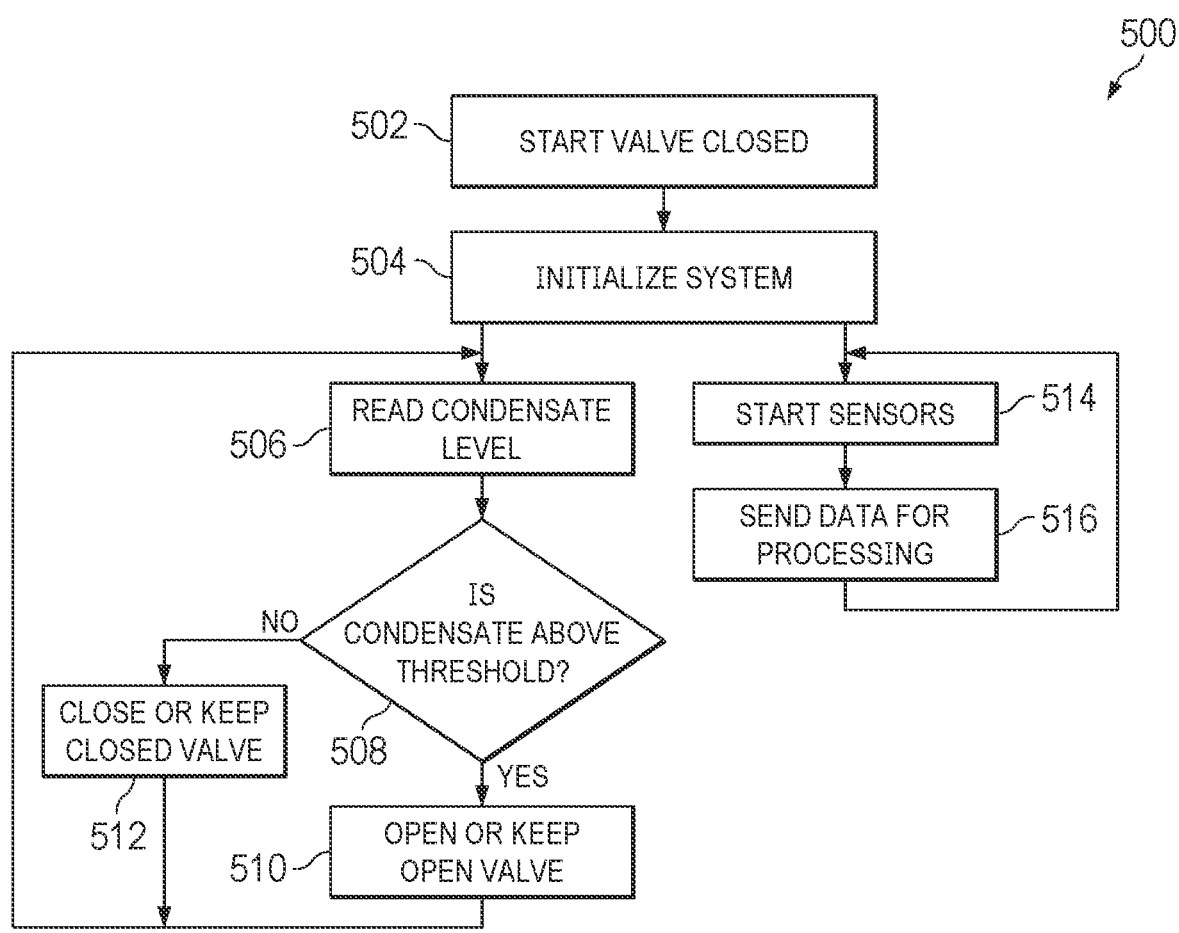
FIG. 5 illustrate an example method, in accordance with embodiments of the present disclosure.

FIG. 5 provides an example method 500 for operation of a steam trap, according to some embodiments. At step 502, the method begins with the steam trap's valve closed, and the control system is initialized at step 504.

At step 506, the control system enters a loop in which the condensate level is read repeatedly (e.g., periodically or from time to time at desired intervals). If the level is above a given threshold at step 508, then at step 510, the valve is opened to release condensate. If not, then the valve is closed at step 512.

Meanwhile, at step 514, one or more sensors are initialized and data may be read from them. The sensors may include one or more of each of a pressure sensor, a temperature sensor, a power system sensor (e.g., a voltage and/or current sensor), a vibration sensor, an acoustic sensor, a pH sensor, and/or other suitable sensors. The sensors may be internal and/or external sensors, in various embodiments. At step 516, the data from the sensors may be sent for processing. For example, the data may be sent to a local processor at the steam trap and/or to a remote location such as a datacenter.

One of ordinary skill in the art with the benefit of this disclosure will understand that the preferred initialization point for the method depicted in FIG. 5 and the steps comprising that method may depend on the implementation chosen. In these and other embodiments, this method may be implemented as hardware, firmware, software, applications, functions, libraries, or other instructions. Further, although FIG. 5 discloses a particular number of steps to be taken with respect to the disclosed method, the method may be executed with greater or fewer steps than depicted. The method may be implemented using any of the various components disclosed herein (such as the components of FIG. 1), and/or any other system operable to implement the method.

Figure 6:
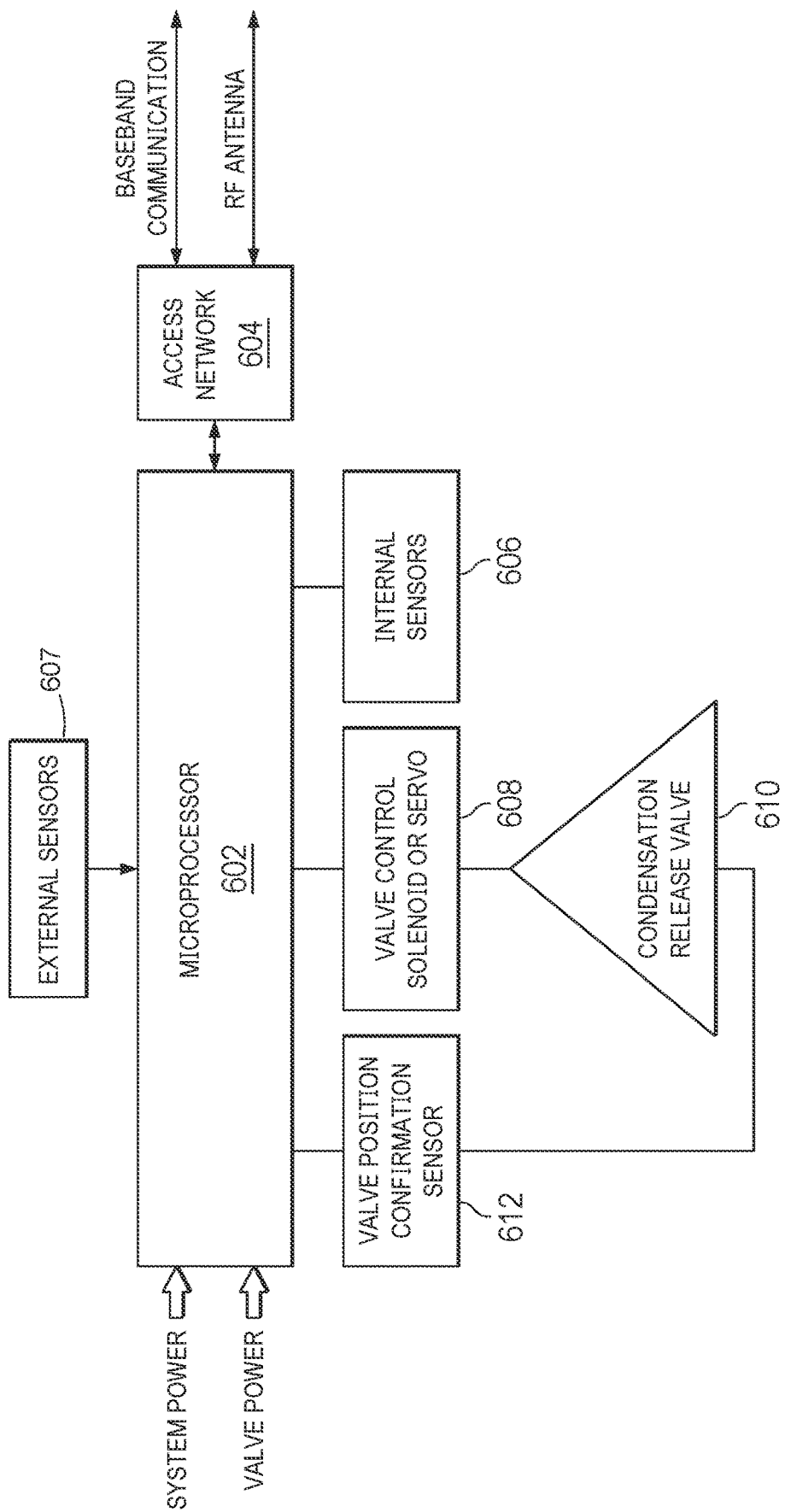
FIG. 6 illustrates an example steam trap, in accordance with embodiments of the present disclosure.

FIG. 6 provides a block electrical diagram of an example steam trap, according to some embodiments. As discussed herein, microprocessor 602 may control condensation release valve 610 via a valve control solenoid or servo 608 (or any other suitable electromechanical mechanism). Valve position confirmation sensor 612 may provide feedback regarding the status of condensation release valve 610, allowing closed-loop control in some embodiments.

The control may be based on input from internal sensors 606 and/or external sensors 607. Microprocessor 602 may also communicate with remote information handling systems via access network 604.

Figure 7:
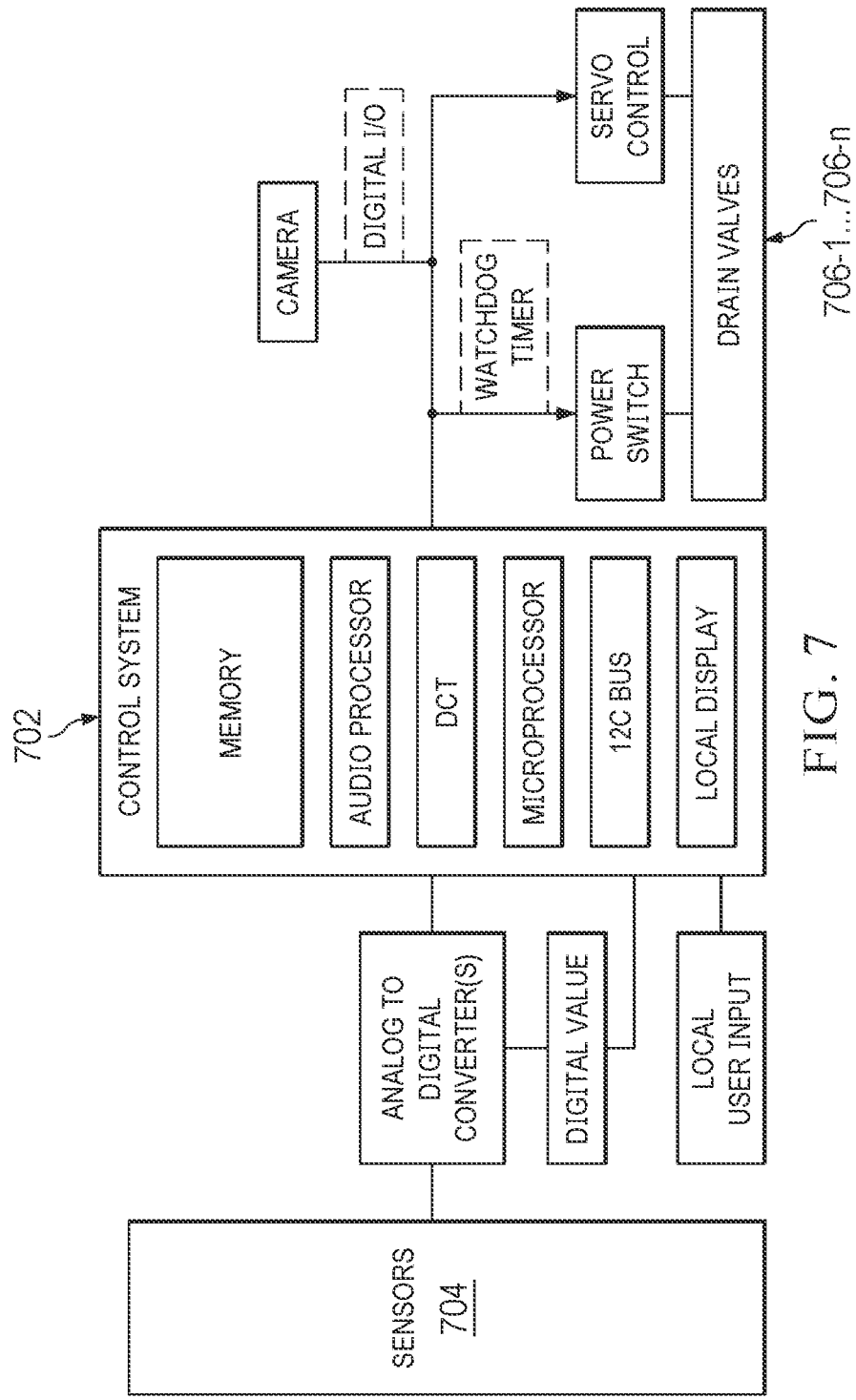
FIG. 7 illustrates an example steam trap, in accordance with embodiments of the present disclosure.

FIG. 7 provides a block diagram of an example control system 702, according to some embodiments. Control system 702 may receive input from various sources including local user input, cameras, a network connection, and sensors 704. Inputs from sensors 704 may pass through one or more analog to digital converters. Control system 702 may perform various types of processing on its input data as discussed herein, and it may transmit output signals configured to control drain valves 706-1 through 706-$n$.

In general, some embodiments of the foregoing may incorporate one or more of the following features:

1. A condensate valve powered and monitored by Thermoelectric Generation (TEG)
2. An electronically controlled condensate release valve that is monitored and controlled via TEG
3. A capacitive water sensor to determine water level in a condensate release valve
4. Measurement of condensate removed locally and/or remotely by knowing the internal pressure, temperature, volume, valve open/closed period and orifice size
5. An acoustic sensor to monitor plant condition
6. Acoustic signature analysis and storage for local and remote alerts
7. Vibration sensor to monitor plant condition
8. Vibration signature analysis and storage for local and remote alerts
9. Compression of acoustic and/or vibration signatures in steam pipes using DCT
10. Vibration sensor to monitor vibration of the pipes
11. External water presence and reporting in the steam trap environment
12. Internal steam contamination detection using electrical, optical and other electronic methods of water contamination inspection As discussed above, embodiments of this disclosure may employ one or more information handling systems in monitoring and controlling steam traps. The following portion of this disclosure discusses such systems in more detail. It will be appreciated by one of ordinary skill in the art with the benefit of this disclosure that some embodiments may employ software, hardware, and/or firmware in implementing various portions of the system. Embodiments of this disclosure may enable communications to a centralized monitoring system, as well as via a mesh network of steam traps. Communication may be wired, wireless, optical, etc. Embodiments may provide encryption for security as well.

Some embodiments may provide data on the time and amount of condensate removed, as well as data from pressure, temperature, vibration, and/or acoustic sensors. This data may be analyzed in a centralized system and/or in the trap itself. The location of the calculations may be dependent on the calculation capacity and the latency for a particular measurement. As the power of microprocessors increases, the ability to calculate locally may increase. Additionally or alternatively, some calculations may take place on a centralized system (e.g., a local server or in a cloud compute environment). The storage and calculation capacity of such systems may enable system-wide or targeted insights into the plant operation.

In some embodiments, calculations as to the amount and/or rate of condensate removal may be volumetric-based, where the difference in the volume of water in the trap when the valve opens and when the valve closes (e.g., as detected by a level sensing system) can be added up. The rate of water entering the trap may also be determined with the level sensing system and the time it takes the trap to fill. The volumetric calculation may be trimmed with the incoming flow rate to increase accuracy of the calculation. The rate of condensate removal may also be calculated by the difference between the pressure inside the trap and the measured (or calculated or assumed) pressure of the discharge, along with the flow characteristics of discharge fittings (e.g., orifice size, etc.).

Most existing steam traps are not monitored. By monitoring individual traps and the steam plant as a whole with the sensors described herein, the following information may be analyzed:

1. Reliable measured and totaled water removal from steam distribution systems
2. Constant monitoring of trap and other system parameters
3. Aggregation of steam distribution system measurements
4. Audio and vibration analysis for detection of flow anomalies in the steam system
5. Frequency analysis of a leak (e.g., a leak at a single trap and/or a leak disposed between two traps). This information may be used to identify and locate leaks, as well as provide notifications regarding leaks
6. Water hammer detection via vibration and amplitude of vibrations and/or acoustics
7. Pressure-in/pressure-out live flow calculations
8. Understanding of water flow pattern of traps (e.g., what patterns can be detected given the aggregate measurement of the available sensors in the time and frequency domains)

By measuring the amount of water drained, the system pressure, acoustic information, vibration information, and temperature information, embodiments may provide an accurate picture of both individual steam traps and the steam system as a whole. Embodiments may detect leaks in the system by acoustical methods, including not only their existence, but an approximate location based on acoustic measurements and knowledge of the pipeline configuration.

Detection of noises of activities that fall outside of normal operation may also give valuable insights. Construction and other activity can generate alerts and be investigated based on not only the location but the time of day as well. The sound of excessive water moving through the system may correspond to a particular acoustical signature. This signature can be used to detect water moving through the system and allow appropriate actions to be taken. Temperature drops at particular times of day may also be used to help track down issues.

The ability to perform complex pattern recognition and bring artificial intelligence to the operations is also enabled in some embodiments. This may enable a deeper understanding of pressure, acoustics, vibrations, and internal temperature, even in situations during which water is not being actively discharged.

Standing water in a metal pipe, as in the case of a trap that fails closed, may cause accelerated and/or excessive corrosion and erosion of the pipe and require replacement. Often, these pipes are buried underground, encased in concrete, in large cities. The time required to find such failures is extended without a real-time monitoring system or extensive inspection time. Existing systems do not have the capability of indicating whether all condensate water has been removed during a valve actuation event. The closing of the trap simply assumes that all water has been removed. Thus embodiments may greatly reduce maintenance costs by providing information about remaining water, if any.

In existing solutions, there is no clear indication of the trap's time required to respond to water events. The detection time vs. time to open, and the clearing of water vs. time to close is unknown. But these timings can be an early indicator of impending trap failure, and it is possible to monitor them in embodiments of the present disclosure.

In one example, if a large amount of water is being removed from the plant on a particular line during a particular time of day, the insights provided by the present disclosure may enable a faster and more complete analysis of the issue. Problems that may increase costs may be found in real time rather than on a preventive maintenance schedule. Thus leaks and other plant issues can be found before they create other issues or grow larger.

In one embodiment, a communication hub may be used as a termination point for the individual communication links for the system. This may be a public communication system (e.g., the internet), a private network (wired, wireless, or some combination thereof). A data collection system may then log the data for analysis.

Data analysis may be focused on individual traps, traps in a particular steam path, and/or the aggregate system as a whole.

Figure 8:
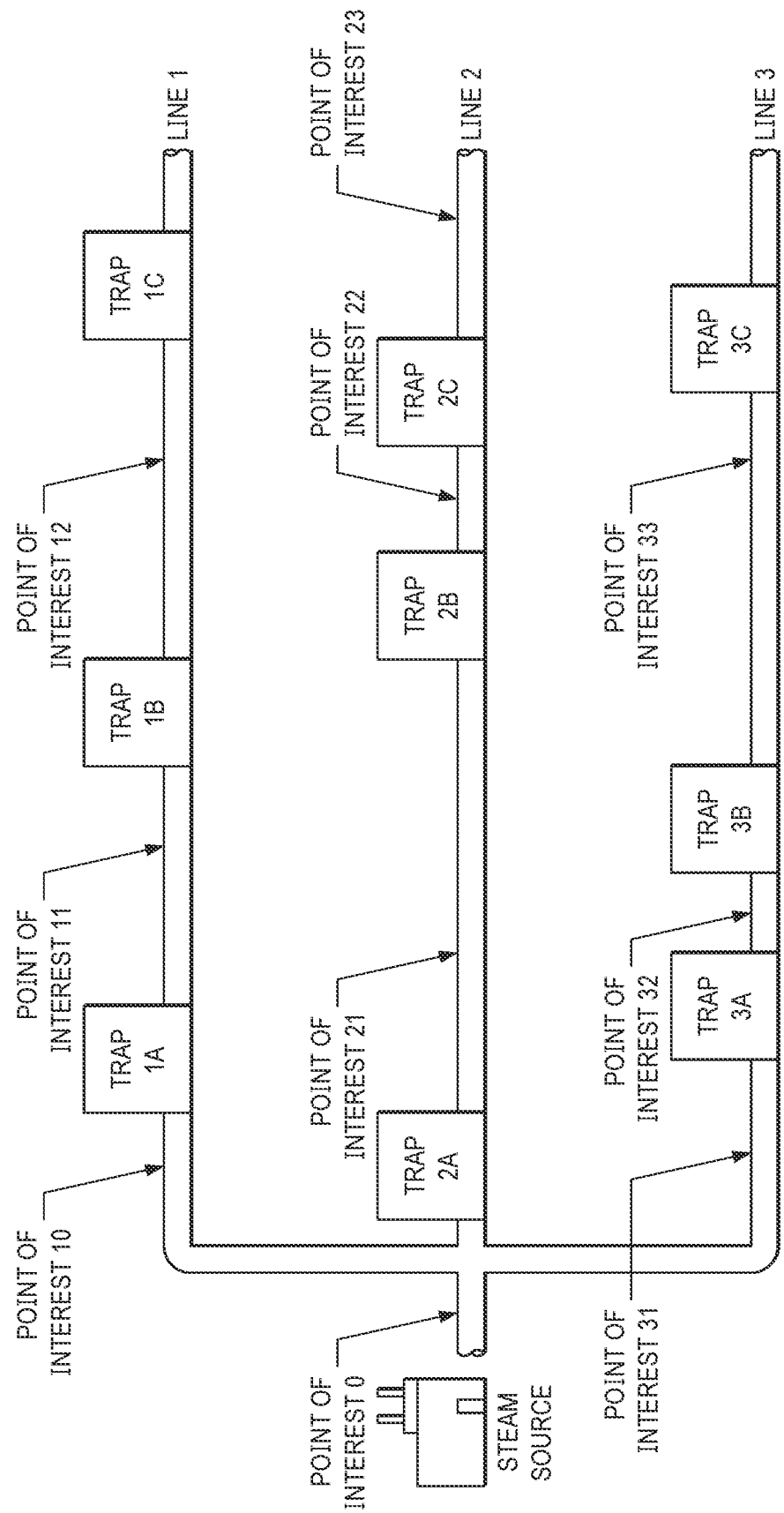
FIG. 8 illustrates an example steam system, in accordance with embodiments of the present disclosure.

Turning now to FIG. 8, an example steam system is shown schematically.

A large amount of condensate removed from Trap 1A relative to traps 2A and 3A may indicate a problem in Line 1. However, a large amount of condensate removed from 1A, 2A, and 3A could indicate a problem further up the line before it branches into separate Lines 1, 2, and 3. By monitoring not only the condensate, but the temperature, pressure, acoustics, and vibrations, a deeper understanding of the plant operations can be achieved.

In another example, if contamination were detected at Traps 3B and 3C, but not at Trap 3A, then this information would help in locating the source of contamination (e.g., likely at point of interest 32).

In the case of a pipe leak, the acoustic signature of a leak may look different depending on how close the sensor is to the leak. If a leak were present at point of interest 32, then Traps 3A and 3B would have a different acoustic signatures than Traps 3C or 2A. In this implementation, the audio data may be transformed using DCT to any level of precision that is required for the application.

Another application of the sensors may include alerting personnel regarding construction projects and other activities. As a backhoe or other equipment gets closer to the pipe, higher frequency sounds may be detected as the soil disruption draws nearer, for example.

Data may be displayed in any of various ways. Heatmaps, graphs, numerical parameters, etc. may be used for system-wide displays or displays targeting particular areas of interest (a single feed pipe, for example) or a single trap. The data may be displayed in the time and/or frequency domains.

Correlation of time, pressure, water release amounts, and/or other measurements may be compared to system and external events (weather, release of external water over pipes, etc.)

A time-lapse view of the data and associated correlations may also be produced in some instances, as well as views of external water and temperature effects on the steam trap and distribution.

Some embodiments may include one or more of the following features:

1. A condensate valve powered and monitored by Thermoelectric Generation (TEG)
2. An electronically controlled condensate release valve that is monitored and controlled via TEG
3. A capacitive water sensor to determine water level in a condensate release valve
4. An external temperature sensor used to monitor and correlate effects on internal steam system
5. An external sensor used to monitor and correlate effects on internal steam system
6. An acoustic sensor to monitor plant conditions
7. Acoustic signature analysis and storage for local and remote alarming
8. A vibration sensor to monitor plant conditions
9. Vibration signature analysis and storage for local and remote alarming. This may operate by analyzing the captured vibrations and/or sounds and seeking a match in a database based on an fingerprint of the captured data. The database may include signatures that correspond to various known problems that may arise.
10. Compression of acoustic signatures in steam pipes using DCT, Fourier, or other transforms
11. A vibration sensor to monitor vibration of the pipes
12. External water presence and reporting in the steam trap environment
13. Internal steam contamination detection using electrical, optical and other electronic methods of water contamination inspection
14. Use of DCT to compress audio and vibration signals for evaluation at a centralized location or at other traps in the system Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Unless otherwise specifically noted, articles depicted in the drawings are not necessarily drawn to scale. However, in some embodiments, articles depicted in the drawings may be to scale.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. A steam trap comprising:
   a processor;
   an electronic water sensor configured to determine a presence of water in the steam trap and transmit data regarding the presence of the water to the processor; and
   an electronically actuatable valve configured to be driven by signals from the processor;
   wherein the processor is further configured to determine, based on the data regarding the presence of the water, a flow rate of condensate water associated with the steam trap;
   wherein the determination of the flow rate of the condensate water is based at least in part on a difference between a first water level measured by the electronic water sensor at a first time associated with an opening of the electronically actuatable valve and a second water level measured by the electronic water sensor at a second time associated with a closing of the electronically actuatable valve.

2. The steam trap of claim 1, wherein the electronic water sensor is a sensor selected from the group consisting of capacitive sensors, optical sensors, acoustic sensors conductive sensors, and any combination thereof.

3. The steam trap of claim 1, further comprising at least one additional sensor.

4. The steam trap of claim 3, further comprising a network interface.

5. The steam trap of claim 4, wherein the processor is configured to transmit, via the network interface, telemetry data regarding physical parameters measured by the electronic water sensor and the at least one additional sensor.

6. The steam trap of claim 1, wherein the electronically actuatable valve comprises a solenoid.

7. The steam trap of claim 1, wherein the electronically actuatable valve comprises a valve sensor configured to measure a degree of openness of the electronically actuatable valve.

8. The steam trap of claim 7, wherein the valve sensor is configured to transmit a signal to the processor indicative of the degree of openness of the electronically actuatable valve.

9. The steam trap of claim 8, wherein the processor is configured to perform closed-loop control of the electronically actuatable valve based on the signal indicative of the degree of openness.

10. A steam system comprising:
    a centralized information handling system; and
    a plurality of steam traps, wherein each respective steam trap includes:
    a processor;
    an electronic water sensor configured to determine a presence of water in the steam trap and transmit data regarding the presence of the water to the processor;
    an electronically actuatable valve configured to be driven by signals from the processor; and
    a network interface;
    wherein the processor is configured to determine, based on the data regarding the presence of the water, a flow rate of condensate water associated with the steam trap;
    wherein the determination of the flow rate of the condensate water is based at least in part on a difference between a first water level measured by the electronic water sensor at a first time associated with an opening of the electronically actuatable valve and a second water level measured by the electronic water sensor at a second time associated with a closing of the electronically actuatable valve;
    wherein the processor is further configured to transmit, via the network interface, telemetry data regarding physical parameters measured by the respective electronic water sensor to the centralized information handling system, wherein the physical parameters include the flow rate of the condensate water; and
    wherein the centralized information handling system is configured to aggregate the telemetry data from each steam trap and analyze the aggregated data.

11. The steam system of claim 10, wherein each electronic water sensor is a sensor selected from the group consisting of capacitive sensors, optical sensors, acoustic sensors conductive sensors, and any combination thereof.

12. The steam system of claim 10, wherein each steam trap further comprises at least one additional sensor.

13. The steam system of claim 10, further configured to transmit an alert to an operator based on the analysis of the aggregated data.

14. The steam system of claim 13, wherein the alert comprises an approximate location of a detected problem.

15. The steam system of claim 14, wherein the approximate location is determined based on acoustic signals detected at one or more of the plurality of steam traps.

* * * * *